United States Patent [19]

Tanaka et al.

[11] Patent Number: 5,691,421

[45] Date of Patent: Nov. 25, 1997

[54] HIGH MOISTURE ADSORPTIVE AND DESORPTIVE FINE PARTICLES AND PROCESS FOR PRODUCING THE SAME

[75] Inventors: Koji Tanaka; Yoko Yamamoto, both of Okayama, Japan

[73] Assignee: Japan Exlan Company Limited, Osaka, Japan

[21] Appl. No.: 787,878

[22] Filed: Jan. 23, 1997

Related U.S. Application Data

[63] Continuation of Ser. No. 559,152, Nov. 17, 1995, abandoned.

[30] Foreign Application Priority Data

Dec. 13, 1994 [JP] Japan ................... 6-333141

[51] Int. Cl.$^6$ .................... C08F 8/32; C08F 8/30
[52] U.S. Cl. .................... 525/329.2; 525/329.1; 525/329.4; 525/328.5; 525/366; 525/376; 526/909
[58] Field of Search .................... 525/329.2, 328.5

[56] References Cited

U.S. PATENT DOCUMENTS

| | | |
|---|---|---|
| 4,172,066 | 10/1979 | Zweigle .................... 526/306 |
| 4,272,422 | 6/1981 | Tanaka . |
| 5,292,822 | 3/1994 | Tanaka .................... 525/376 |

OTHER PUBLICATIONS

Derwent Publications Ltd., London, GB; AN 94-355268 & JP-A-06 280 110 (Toyobo) (Oct. 14, 1994) (abstract).

Derwent Publications Ltd., London, GB; AN 90-150286 & JP-A-02 091 27 (Japan Exlan) (Mar. 30, 1990) (abstract).

*Primary Examiner*—Fred Zitomer
*Attorney, Agent, or Firm*—Wenderoth, Lind & Ponack

[57] ABSTRACT

Fine particles (having a particle diameter smaller than 10 μm) of crosslinked acrylonitrile polymer capable of absorbing and releasing a large amount of moisture, in which the acrylonitrile polymer is crosslinked with hydrazine such that the nitrogen content increases by 1.0–15.0 wt % and there being introduced salt type carboxyl groups in an amount of 1.0 mmol/g or more into a part of the remaining nitrile groups. Said fine particles are prepared by treating an emulsion of acrylonitrile polymer with hydrazine so that crosslinks are formed in the acrylonitrile polymer and the nitrogen content increases by 1.0–15.0 wt % and then hydrolyzing the crosslinked acrylonitrile polymer so as to introduce more than 1.0 mmol/g of carboxyl groups in salt form into nitrile groups remaining uncrosslinked and to introduce amide groups to the rest of nitrile groups.

2 Claims, No Drawings

HIGH MOISTURE ADSORPTIVE AND DESORPTIVE FINE PARTICLES AND PROCESS FOR PRODUCING THE SAME

This application is a continuation of now abandoned application Ser. No. 08/559,152, filed Nov. 17, 1995.

BACKGROUND OF THE INVENTION

1. Field of the Invention

The present invention relates to moisture adsorptive and desorptive fine particles which perform moisture adsorption and desorption reversibly and withstand repeated use.

2. Description of the Prior Art

A conventional way of removing moisture from air resorts to moisture absorbents such as lithium chloride, calcium chloride, magnesium chloride, and phosphorus pentoxide. Despite their ability to absorb a large amount of moisture rapidly, they possess some drawbacks due to their deliquescence. That is, they become liquid after moisture absorption, causing contamination, and they are difficult to mold and regenerate. Other moisture absorbents such as silica gel, zeolite, sodium sulfate, activated alumina, and activated carbon suffer the disadvantage of being limited in the amount of moisture absorption, being slow in the rate of moisture absorption, and requiring high temperature for their regeneration. This prevents them from being put to practical use. These moisture absorbents pose a problem when used as an additive. That is, they impair the physical properties and appearance of the material to which they are added, because they have a large particle size.

SUMMARY OF THE INVENTION

It is an object of the present invention to provide high moisture absorptive and desorptive fine particles and a process for producing the same. This moisture absorbent absorbs a large amount of moisture, can be regenerated easily by drying, and has such a small particle diameter that it does not impair the appearance and physical properties of the base material when used as an additive.

The above-mentioned object of the present invention can be achieved by high moisture adsorptive and desorptive fine particles characterized in that said particles are of crosslinked acrylonitrile polymer and are 1.0–15.0% by weight of the increase in nitrogen content due to crosslinking by hydrazine, there being introduced salt type carboxyl groups in an amount of 1.0 mmol/g or more into a part of the remaining nitrile groups, and the particle diameter of said fine particles being 10 µm or less.

The above-mentioned object of the present invention can also be achieved by a process for producing high moisture adsorptive and desorptive fine particles characterized in that an emulsion of an acrylonitrile polymer is subjected to the treatment with hydrazine to introduce crosslinking bond into the fine particles so that the increase in the nitrogen content is 1.0–15.0% by weight, and then subjected to hydrolysis so that there are introduced carboxyl groups into 1.0 mmol/g or more of the remaining nitrile groups and amide groups are introduced into all of the remaining nitrile groups, said carboxyl groups being in the form of salt type.

DESCRIPTION OF THE PREFERRED EMBODIMENTS

The product according to the present invention is in the form of fine particles of crosslinked acrylonitrile polymer. It is produced from fine particles of acrylonitrile polymer containing more than 40 wt %, preferably more than 50 wt %, of acrylonitrile (AN for short hereinafter). The AN polymer may be either a homopolymer or a copolymer with a comonomer. Examples of the comonomer include vinyl halide and vinylidene halide; (meth) acrylic ester; sulfonic acid-containing monomer and salt thereof (such as methallylsulfonic acid and p-styrenesulfonic acid and the like); carboxylic acid-containing monomer and salt thereof (such as (meth) acrylic acid and itaconic acid and the like); and acrylamide, styrene, and vinyl acetate and the like. The AN polymer fine particles as the starting material can be prepared typically by the process disclosed in Japanese Patent Publication No. 2207/1980. The present invention is not limited to this process.

The method of introducing hydrazine crosslinks (crosslinking) into the AN polymer fine particles is not specifically limited so long as it is capable of increasing the nitrogen content by 1.0–15.0 wt %. An industrially favorable method is treatment at 50°–120° C. for 0.5–5 hours in the form of emulsion containing 6–80% of hydrazine. "Increase in nitrogen content" means the difference between the nitrogen content (in wt % based on fine particles) in AN polymer fine particles as the starting material and the nitrogen content (in wt % based on fine particles) in hydrazine-crosslinked AN polymer fine particles. If the increase in nitrogen content is less than the lower limit specified above, the fine particles will dissolve in water in the subsequent step of hydrolysis which is intended to introduce carboxyl groups, and hence the object of the present invention is not achieved. If the increase in nitrogen content exceeds the upper limit specified above, the fine particles do not accept more than 1.0 mmol/g of carboxyl groups in the subsequent step, and hence the object of the present invention is not achieved. The condition under which the nitrogen content increases by 1.0–15.0 wt % will vary depending on the reaction temperature and time and the concentrations of reactants which may be determined easily by experiment. Examples of the hydrazine include hydrazine hydrate, hydrazine sulfate, hydrazine hydrochloride, hydrazine nitrate, and hydrazine hydrobromide and the like.

According to the process of the present invention, nitrile groups remaining intact after crosslinking by hydrazine are substantially eliminated by hydrolysis in such a manner that more than 1.0 mmol/g of carboxyl groups in salt form are introduced into nitrile groups and amide groups are introduced into the rest of nitrile groups. This process is accomplished by heat treatment in the presence of an alkaline aqueous solution of alkali metal hydroxide or ammonia or a mineral acid such as nitric acid, sulfuric acid, and hydrochloric acid and the like. According to the present invention, the amount of carboxyl groups in salt form should be more than 1.0 mmol/g. This condition may be easily determined by experiment on the relation between the amount of carboxyl groups in salt form and the reaction factors (such as temperature, concentration, and time). Incidentally, it is also possible to carry out hydrolysis simultaneously with the introduction of crosslinks. In the case where an acid is used for hydrolysis, it is necessary to convert the carboxyl groups into those of salt form.

An adequate method of converting carboxyl groups into those of salt form is to treat the hydrolyzed emulsion with any of hydroxides of a variety of salt types or salts exemplified below. Salts of carboxyl groups are formed from cationic ion of alkali metals (such as Li, Na, and K and the like), alkaline earth metals ( such as Be, Mg, Ca, and Ba and the like), other metals (such as Cu, Zn, Al, Mn, Ag, Fe, Co., and Ni and the like), $NH_4$, and organic (such as amine and the like). If the amount of carboxyl groups in salt form is less than the lower limit specified above, the resulting product does not exhibit the desired performance. More than one salt may be used.

According to the present invention, the fine particles should have a particle diameter smaller than 10 μm. The way of achieving this object is not specifically limited. A typical example is disclosed in Japanese Patent Publication No. 2207/1980. A particle diameter greater than 10 μm leads to a slow rate of moisture absorption. Such fine particles impair the appearance and physical properties of the base material and easily drop off from the base material when used as an additive.

In this way it is possible to provide the fine particles mentioned above which have a moisture absorption higher than 20%, preferably higher than 35% and which can be easily regenerated by drying. Moisture absorption is measured by the method described in Example which follows.

It is not yet fully elucidated why the fine particles of the present invention have the high moisture adsorptive and desorptive properties. A probable reason is as follows: The fact that the fine particles contain substantially no nitrile groups although they are prepared from AN polymer suggests that side chains attached to polymer chains have the crosslink structure containing nitrogen which is formed by reaction with hydrazine and the carboxyl groups in salt form which are formed by hydrolysis of nitrile groups. In addition, it is considered that the crosslinking structure also contributes to moisture absorption judging from the fact that the carboxyl groups in salt form are not enough in quantity for high moisture absorption although they are capable of absorbing and releasing moisture. Moreover, the fact that the fine particles after moisture absorption are not sticky suggests a high degree of crosslinking.

The invention will be described with reference to the following examples, in which parts and percent are based on weight unless otherwise indicated.

The amount (mmol/g) of carboxyl groups in salt form and the moisture absorption were measured according to the following procedure.

(1) Amount (mmol/g) of carboxyl groups in salt form:

Accurately weigh about 1 g of completely dried sample. Add 200 g of water to the weighed sample. After heating to 50° C., add 1-N hydrochloric acid to adjust the solution to pH 2. Titration curve was obtained with 0.1-N NaOH solution in the usual way. From the titration curve, an amount of NaOH solution which was consumed by carboxyl groups was obtained. The amount of carboxyl groups is calculated from the equation below.

Amount of carboxyl groups=(0.1×Y)/X where X is the amount (g) of sample, and Y is the volume (cc) of NaOH solution which was consumed by carboxyl groups.

Repeat the same procedure as above, excluding the pH adjustment. The amount of carboxyl groups in salt form is calculated from the equation below.

(Amount of carboxyl groups in salt form)=(Amount of carboxyl groups)−(Amount of carboxylic acid)

(2) Moisture absorption (%)

Weigh about 5.0 g of sample after drying in a vacuum dryer at 70° C. for 12 hours. Allow the dried sample to stand in a humidistat at 20° C. for 24 hours. Measure the weight of the conditioned sample. The moisture absorption is calculated from the equation below.

Moisture absorption (%)=(W2−W1)/W1×100 where W1 is the weight of the dried sample, and W2 is the weight of the conditioned sample.

EXAMPLE 1

A 2-liter autoclave was charged with 490 parts of acrylonitrile, 16 parts of sodium p-styrenesulfonate, and 1181 parts of water. Di-tert-butylperoxide (as a polymerization initiator) was added in an amount of 0.5% for the total amount of monomer. With the autoclave closed, polymerization was carried out with stirring at 150° C. for 23 minutes. After the completion of reaction, stirring was continued until the reaction product was cooled to about 90° C. There was obtained an aqueous dispersion of fine particles (I) having an average particle diameter of 0.2 μm (measured by a light scattering photometer).

To the aqueous dispersion of fine particles (I) was added hydrazine in such an amount that its concentration in the bath was 35%. The bath was kept at 102° C. for 2.5 hours to effect crosslinking. To the bath was added NaOH in such an amount that its concentration in the bath was 10%. The bath was kept at 102° C. for 5 hours to effect hydrolysis. The reaction product was poured into a cellulose tube, which was then placed in running water for one week for dialysis and desalting. There was obtained an aqueous dispersion of fine particles (No. 1).

The same treatment as mentioned above was performed on the aqueous dispersion of fine particles (I) under different conditions shown in Table 1. Thus there were obtained samples of fine particles (Nos. 2 to 12). After drying, at 105°, these fine particles (Nos. 1 to 12) were tested for characteristic properties. The results are shown in Table 1.

TABLE 1

| Example | Fine particles No. | Treatment with hydrazine % | °C. | hours | Treatment with NaOH % | °C. | hours | Increase in nitrogen content (%) | Amount of carboxyl groups in Na salt form (mmol/g) | Moisture absorption (%) |
| --- | --- | --- | --- | --- | --- | --- | --- | --- | --- | --- |
| Working examples | 1 | 35 | 102 | 2.5 | 10 | 102 | 3 | 3.7 | 4.5 | 45 |
|  | 2 | 80 | 102 | 3 | 10 | 102 | 3 | 8.2 | 1.2 | 27 |
|  | 3 | 80 | 55 | 5 | 10 | 102 | 3 | 1.2 | 6.3 | 48 |
|  | 4 | 7 | 120 | 5 | 10 | 102 | 3 | 2.4 | 5.4 | 47 |
|  | 5 | 35 | 102 | 2.5 | 5 | 102 | 3 | 3.7 | 2.3 | 30 |
|  | 6 | 35 | 102 | 2.5 | 10 | 102 | 0.5 | 3.7 | 2.9 | 35 |
|  | 7 | 35 | 102 | 2.5 | 15 | 102 | 3 | 3.7 | 6.0 | 54 |
|  | 8 | 35 | 102 | 2.5 | 10 | 75 | 5 | 3.7 | 1.3 | 22 |
| Comparative | 9 | 5 | 102 | 5 | 10 | 102 | 3 | 0.9 | —* | —* |

TABLE 1-continued

| Example | Fine particles No. | Treatment with hydrazine % | Treatment with hydrazine °C. | Treatment with hydrazine hours | Treatment with NaOH % | Treatment with NaOH °C. | Treatment with NaOH hours | Increase in nitrogen content (%) | Amount of carboxyl groups in Na salt form (mmol/g) | Moisture absorption (%) |
|---|---|---|---|---|---|---|---|---|---|---|
| Examples | 10 | 35 | 45 | 5 | 10 | 102 | 3 | 0.9 | —* | —* |
|  | 11 | 35 | 102 | 2.5 | 10 | 50 | 3 | 3.7 | 0.8 | 17 |
|  | 12 | 80 | 125 | 5 | 10 | 102 | 3 | 15.2 | 0.2 | 18 |

*Measurements were impossible because the samples dissolved during hydrolysis.

It is noted from Table 1 that samples of fine particles (Nos. 1 to 8) are superior in moisture absorption. By contrast, comparative sample No. 9 (by treatment with hydrazine in low concentration) and comparative example No. 10 (by treatment with hydrazine at low temperature) dissolved during hydrolysis because of insufficient increase in nitrogen content and hence insufficient crosslinking. They did not give fine particles. Sample No. 11 (with insufficient hydrolysis) and sample No. 12 (with insufficient hydrolysis due to excess crosslinking) gave fine particles poor in moisture absorption.

EXAMPLE 2

Fine particles No. 1 obtained in Example 1 were processed so as to convert the carboxyl groups into H form. The aqueous dispersion (30 g) was immersed in 1 liter of 5% aqueous solution of salt shown in Table 2 at 40° C. for 5 hours. Subsequently, it was poured into a cellulose tube and placed in running water for one week for dialysis and desalting. There were obtained aqueous dispersions of fine particles Nos. 13 to 16. These samples were tested for characteristic properties. The results are shown in Table 2.

TABLE 2

| Fine particles No. | Kind of salt | Amount of carboxyl groups in salt form (mmol/g) | Moisture absorption at 65% RH (%) |
|---|---|---|---|
| 13 | LiCl | 4.4 | 44 |
| 14 | $CuSO_4$ | 4.5 | 25 |
| 15 | $CaSO_4$ | 4.5 | 31 |
| 16 | $Al_2(SO_4)_3$ | 4.4 | 22 |

It is noted from Table 2 that the fine particles of salt type in this example also have good moisture absorbing characteristics.

EXAMPLE 3

One gram of fine particles No. 1 obtained in Example 1 was allowed to stand in a humidistat (90% humidity) for 24 hours. It was then allowed to stand in a humidistat (40% humidity) for 1 hour. This procedure was repeated twice. The fine particles were tested for moisture adsorption and desorption performance. The results are shown in Table 3.

TABLE 3

| Humidity (%) | Moisture absorption (%) |
|---|---|
| 90 | 57 |
| ↓ |  |
| 40 | 29 |
| ↓ |  |

TABLE 3-continued

| Humidity (%) | Moisture absorption (%) |
|---|---|
| 90 | 56 |
| ↓ |  |
| 40 | 29 |

It is noted from Table 3 that the sample in this example is superior in moisture adsorption and desorption characteristics. By contrast, commercial moisture absorbent, such as silica gel and zeolite, need high temperature for regeneration.

EXAMPLE 4

The same procedure as in Example 1 was repeated except that the amount of acrylonitrile was changed from 490 parts to 450 parts and 40 parts of methyl acrylate was used. There was obtained an aqueous dispersion of fine particles (II). It was treated in the same manner as in Example 1.

The resulting fine particles had an average particle diameter of 0.2 μm (measured by a light scattering photometer) and an increase in nitrogen content by 3.4%, with the amount of carboxyl groups in salt form being 4.5 mmol/g. The moisture absorption of this sample was 44% at 65% RH.

EXAMPLE 5

Aqueous dispersions were prepared from samples of fine particles differing in particle diameter. (The fine particles have a moisture absorption of 43–46% at 65% RH.) Each aqueous dispersion was mixed with Desmolac 4125 (a product of Sumitomo Bayer Urethane Co., Ltd.) such that the ratio of solids in the resulting mixture was 15/85. The mixture was made into film by wet process. There were obtained film samples Nos. 1 to 6. The film samples were tested for tensile strength. The results are shown in Table 4. For comparison, a film sample No. 7 was prepared which is not incorporated with the fine particles. Its test results are also shown in Table 4.

TABLE 4

| Example | Film No. | Average particle diameter (μm) | Tensile strength (N/mm²) | Moisture absorption at 65% RH (%) |
|---|---|---|---|---|
| Example | 1 | 0.2 | 30 | 7.9 |
|  | 2 | 1.3 | 29 | 8.0 |
|  | 3 | 6.1 | 27 | 7.9 |
|  | 4 | 9.6 | 27 | 7.9 |
| Comparative | 5 | 15.0 | 21 | 7.5 |
| Example | 6 | 20.5 | 15 | 7.4 |
| Referential | 7 | — | 30 | 1.4 |

TABLE 4-continued

| Example | Film No. | Average particle diameter (μm) | Tensile strength (N/mm²) | Moisture absorption at 65% RH (%) |
| --- | --- | --- | --- | --- |
| Example | | | | |

It is noted from Table 4 that the film samples in this example have moisture absorption of 7–8% at 65% RH, whereas the film sample without fine particles have moisture absorption of 1.4%. The effect of fine particles on moisture absorption is apparent. It is also noted that film samples Nos. 1 to 4 (which were incorporated with fine particles pertaining to the present invention) exhibited good moisture absorption without adverse effect on tensile strength, whereas comparative film samples Nos. 5 and 6 have a low tensile strength. This suggests that fine particles having a larger average particle diameter are not suitable for use as an additive.

The significant feature of the present invention is that high moisture adsorptive and desorptive fine particles having an extremely small particle diameter can be produced in an industrially favorable manner. The high moisture adsorptive and desorptive fine particles in this invention do not become sticky after moisture absorption because of the high degree of crosslinking among molecules. In addition, they can be regenerated easily by drying and used repeatedly. They have such a small particle diameter that they can be added to any material without adverse effect on its physical properties and appearance. Therefore, they will find use in various fields where moisture adsorption and desorption are required.

What is claimed is:

1. High moisture adsorptive and desorptive fine particles having a particle size of not larger than 10 μm, said particles being produced by copolymerizing acrylonitrile and sodium p-styrenesulfonate, crosslinking the thus produced copolymer with hydrazine to increase the nitrogen content in the acrylonitrile by 15% by weight, hydrolyzing nitrile groups in the copolymer to form carboxyl and amide groups and converting the carboxyl groups to salts thereof such that the finally produced copolymer fine particles have 1.0 mmole/g of salt carboxyl groups.

2. A process for producing high moisture absorptive and desorptive fine particles having a particle size not larger than 10 μm by copolymerizing acrylonitrile and sodium p-styrenesulfonate, crosslinking the thus produced copolymer with hydrazine to increase the nitrogen content in the acrylonitrile by 15% by weight, hydrolyzing nitrile groups in the copolymer to form carboxyl and amide groups and converting the carboxyl groups to salts thereof such that the finally produced copolymer fine particles have 1.0 mmole/g of salt carboxyl groups.

* * * * *